US010931139B1

(12) United States Patent
Andrews et al.

(10) Patent No.: US 10,931,139 B1
(45) Date of Patent: Feb. 23, 2021

(54) EMERGENCY BATTERY PACKS FOR LOW VOLTAGE SYSTEMS

(71) Applicant: SIGNIFY HOLDING B.V., Eindhoven (NL)

(72) Inventors: James Christopher Andrews, Mableton, GA (US); Kevin O. Porter, Peachtree City, GA (US); Yash Sanjay Rajwade, Raleigh, NC (US)

(73) Assignee: SIGNIFY HOLDING B.V., Eindhoven (NL)

( * ) Notice: Subject to any disclaimer, the term of this patent is extended or adjusted under 35 U.S.C. 154(b) by 387 days.

(21) Appl. No.: 15/385,066

(22) Filed: Dec. 20, 2016

Related U.S. Application Data

(60) Provisional application No. 62/272,544, filed on Dec. 29, 2015.

(51) Int. Cl.
  *H02J 9/06* (2006.01)
  *H02J 9/02* (2006.01)
  *H02J 7/00* (2006.01)

(52) U.S. Cl.
  CPC ............ *H02J 9/061* (2013.01); *H02J 7/0021* (2013.01); *H02J 9/02* (2013.01)

(58) Field of Classification Search
  CPC ............. H02J 9/061; H02J 7/0021; H02J 9/02
  See application file for complete search history.

(56) References Cited

U.S. PATENT DOCUMENTS

| | | |
|---|---|---|
| 3,636,404 A | 1/1972 | Appleton |
| 4,065,676 A | 12/1977 | Elias |
| 4,251,883 A | 2/1981 | Grants |
| 4,286,204 A | 8/1981 | Belot |
| 4,560,886 A | 12/1985 | Ferguson |
| 5,254,930 A | 10/1993 | Daly |
| 5,532,523 A | 7/1996 | Tang |
| 5,541,829 A | 7/1996 | Maehara |
| 5,635,816 A | 1/1997 | Welsh et al. |
| 5,933,812 A | 8/1999 | Meyer |
| 6,286,127 B1 | 9/2001 | King |
| 6,492,792 B1 | 12/2002 | Johnson |
| 6,590,786 B2 | 7/2003 | Gurov |
| 6,677,730 B2 | 1/2004 | Bedini |
| 6,737,832 B2 | 5/2004 | Uchida |
| 6,864,669 B1 | 3/2005 | Bucur |
| 7,026,726 B2 | 4/2006 | Shiojima |
| 7,405,953 B2 | 7/2008 | Nakamura |
| 7,547,990 B2 | 6/2009 | Varzhabedian |

(Continued)

*Primary Examiner* — Jared Fureman
*Assistant Examiner* — Emmanuel Dominique

(57) ABSTRACT

A distributed low voltage power system can include a power distribution module (PDM) that distributes a low voltage signal through at least one output channel. The system can also include at least one electrical device coupled to the at least one output channel of the PDM, where the at least one electrical device operates using the low voltage signal. The system can further include an emergency battery pack (EBP) coupled to the at least one output channel of the PDM and to the at least one electrical device, where the EBP comprises at least one battery cell. The EBP can use the low voltage signal to charge the at least one battery cell, and where the EBP releases emergency low voltage signal to the at least one electrical device when the PDM stops distributing the low voltage signal.

20 Claims, 8 Drawing Sheets

(56) References Cited

U.S. PATENT DOCUMENTS

| | | |
|---|---|---|
| 7,622,898 B2 | 11/2009 | Shimizu et al. |
| 7,759,900 B2 | 7/2010 | Samstad |
| 7,804,273 B2 * | 9/2010 | Popescu-Stanesti ........................ H02J 7/0068 320/108 |
| 7,816,889 B2 | 10/2010 | Yang |
| 7,872,373 B2 | 1/2011 | Henkel |
| 8,072,187 B2 | 12/2011 | Wu et al. |
| 8,213,203 B2 | 7/2012 | Fei |
| 8,362,647 B2 | 1/2013 | Anderson |
| 8,378,596 B2 | 2/2013 | Ayres |
| 8,629,631 B1 | 1/2014 | Rhodes |
| 8,689,032 B2 | 4/2014 | Kurahashi |
| 9,083,180 B2 | 7/2015 | Dodal |
| 9,143,005 B1 | 9/2015 | Laird |
| 9,203,265 B2 | 12/2015 | Alappat |
| 9,356,470 B2 | 5/2016 | Yamamoto |
| 9,692,297 B2 | 6/2017 | Archibald |
| 9,812,901 B2 | 11/2017 | Descarries |
| 9,871,388 B2 | 1/2018 | Nakamura |
| 2008/0141998 A1 | 6/2008 | Sun |
| 2008/0191628 A1 * | 8/2008 | Marques ................ H05B 47/29 315/86 |
| 2008/0296975 A1 | 12/2008 | Shakespeare |
| 2009/0167091 A1 * | 7/2009 | Popescu-Stanesti ...... H02J 7/34 307/66 |
| 2010/0159293 A1 | 6/2010 | Hempel |
| 2012/0023340 A1 * | 1/2012 | Cheung ................... G06F 1/266 713/300 |
| 2013/0147276 A1 | 6/2013 | Yamamoto |
| 2015/0008867 A1 | 1/2015 | Smychkovich |
| 2016/0033986 A1 | 2/2016 | Kamel |
| 2016/0036268 A1 * | 2/2016 | Laherty ................ H02J 9/065 307/19 |
| 2016/0141915 A1 | 5/2016 | Descarries |
| 2016/0273722 A1 * | 9/2016 | Crenshaw ........... H05B 47/185 |
| 2017/0245334 A1 | 8/2017 | Zhang |
| 2018/0219635 A1 * | 8/2018 | Sipes, Jr. ............. H04B 10/077 |

* cited by examiner

EMERGENCY BATTERY PACKS FOR LOW VOLTAGE SYSTEMS

CROSS-REFERENCE TO RELATED APPLICATIONS

This application claims priority under 35 U.S.C. § 119 to U.S. Provisional Patent Application Ser. No. 62/272,544, titled "Emergency Battery Packs For Low Voltage Systems" and filed on Dec. 29, 2015, the entire contents of which are hereby incorporated herein by reference.

TECHNICAL FIELD

Embodiments described herein relate generally to power distribution systems, and more particularly to systems, methods, and devices for emergency battery packs for low voltage systems.

BACKGROUND

Emergency battery packs are used in a number of applications to provide power to electrical devices when a main source of power is interrupted. These emergency battery packs are in communication with the primary source of power, both to ensure that the batteries in the emergency battery pack are charged, and to know when the primary source of power is interrupted.

SUMMARY

In general, in one aspect, the disclosure relates to a distributed low voltage power system. The distributed low voltage power system can include a power distribution module (PDM) that distributes a low voltage signal through at least one output channel. The distributed low voltage power system can also include at least one electrical device coupled to the at least one output channel of the PDM, where the at least one electrical device operates using the low voltage signal. The distributed low voltage power system can further include an emergency battery pack (EBP) coupled to the at least one output channel of the PDM and to the at least one electrical device, where the EBP comprises at least one battery cell. The EBP can use the low voltage signal to charge the at least one battery cell, where the EBP releases emergency low voltage signal to the at least one electrical device when the PDM stops distributing the low voltage signal.

In another aspect, the disclosure can generally relate to a distributed low voltage power system. The distributed low voltage power system can include a point of load (PoL) driver that distributes a low voltage signal through at least one output channel. The distributed low voltage power system can also include at least one electrical device coupled to the at least one output channel of the PoL driver, where the at least one electrical device operates using the low voltage signal. The distributed low voltage power system can further include an emergency battery pack (EBP) coupled to the at least one output channel of the PoL driver and to the at least one electrical device, where the EBP comprises at least one battery cell. The EBP can use the low voltage signal to charge the at least one battery cell, where the EBP releases emergency low voltage signal to the at least one electrical device when the PoL driver stops distributing the low voltage signal.

In yet another aspect, the disclosure can generally relate to an emergency battery pack. The emergency battery pack can include an input channel configured to receive low voltage (LV) signal from a LV power source. The emergency battery pack can also include at least one battery unit coupled to the input channel, where the at least one battery unit comprises at least one rechargeable battery that charges using the LV signal. The emergency battery pack can further include an output channel coupled to the at least one battery unit. The emergency battery pack can also include a first switch disposed between the at least one battery unit and the output channel, where the first switch has an open position and a closed position. The first switch, when in the closed position, can allow the at least one battery unit to release an emergency LV signal to the output channel. The first switch, when in the open position, can prevent the at least one battery unit from releasing the emergency LV signal to the output channel. The LV signal can allow the emergency battery pack to qualify as a Class 2 device.

These and other aspects, objects, features, and embodiments will be apparent from the following description and the appended claims.

BRIEF DESCRIPTION OF THE DRAWINGS

The drawings illustrate only example embodiments of emergency battery packs for low voltage systems and are therefore not to be considered limiting of its scope, as shared power for power distribution modules may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
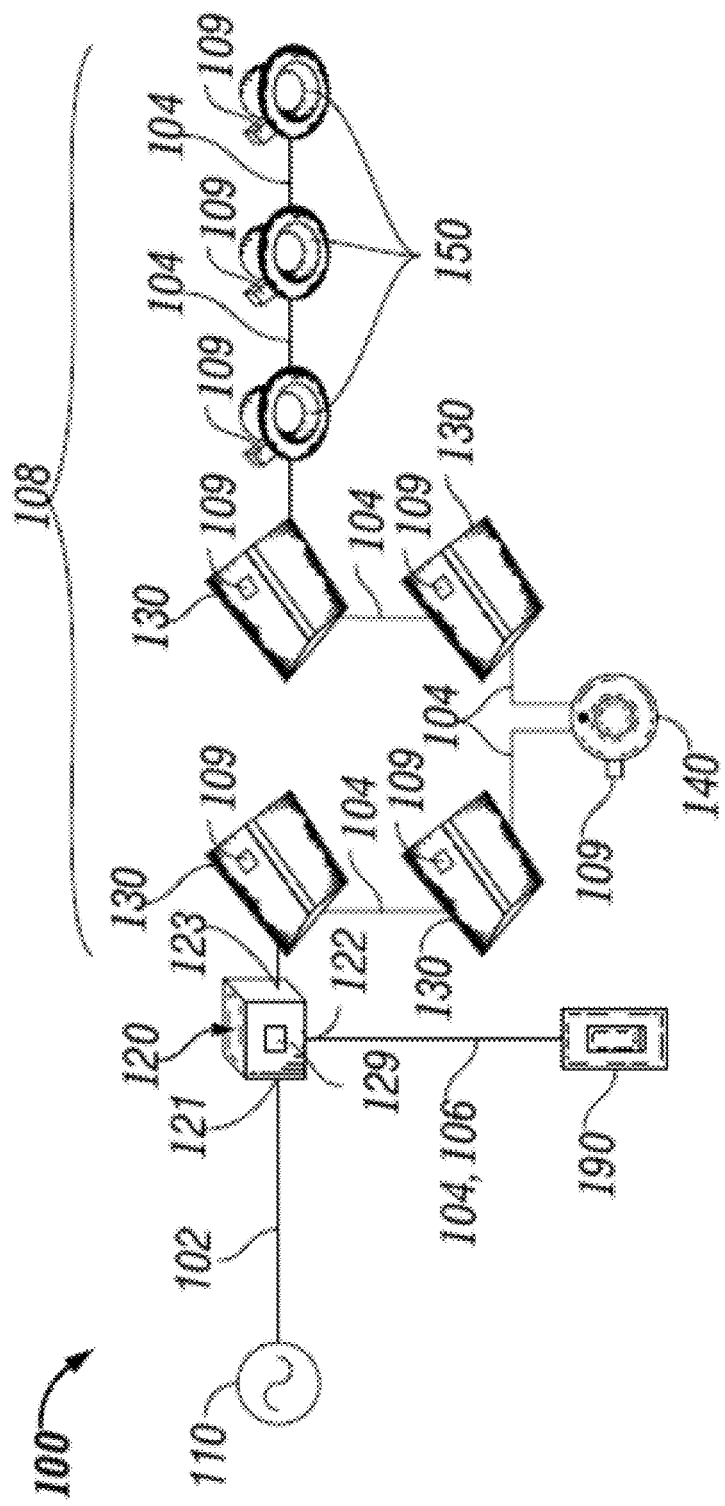
FIGS. 1 and 2 show system diagrams of distributed low voltage power systems for which example emergency battery packs can be used.

The example embodiments discussed herein are directed to systems, apparatuses, and methods of emergency battery packs (EBPs) for low voltage systems. Example embodiments described herein are directed to use with low power (e.g., up to 100 VAC, no more than 60 VDC) systems, also called Class 2 circuits (described in more detail below). While example embodiments are described herein as being used with power over Ethernet (POE) applications and distributed low voltage power (DLVP) systems, example EBPs can also be used in any of a number of other types of low power (e.g., voltage, current, VARs, and VAs) systems.

As described herein, a user can be any person that interacts with example PDMs. Examples of a user may include, but are not limited to, a consumer, an electrician, an engineer, a mechanic, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

As used herein, the term "battery" can refer to any type of energy storage device that uses any one or more of a number of technologies. Examples of such energy storage devices can include, but are not limited to, a battery (defined below), a super capacitor, a flywheel, a fuel cell, and a solar cell.

In certain example embodiments, the systems (or portions thereof) that include example EBPs for low voltage systems described herein meet one or more of a number of standards, codes, regulations, and/or other requirements established and maintained by one or more entities. Examples of such entities include, but are not limited to, Underwriters' Laboratories (UL), the National Electric Code (NEC), the Institute of Electrical and Electronics Engineers (IEEE), and the National Fire Protection Association (NFPA). For example, wiring (the wire itself and/or the installation of such wire) that electrically couples an example EBP (defined below) with a device may fall within one or more standards set forth in the NEC. Specifically, the NEC defines Class 1 circuits and Class 2 circuits under various Articles, depending on the application of use. As another example, UL 924 applies to emergency lighting using example embodiments. As yet another example, UL 2108 applies to low voltage lighting systems using example embodiments. As yet a further example, NFPA 101 applies to buildings using example embodiments.

Class 1 circuits under the NEC typically operate using line voltages (e.g., between 120 VAC and 600 VAC). The wiring used for Class 1 circuits under the NEC must be run in raceways, conduit, and enclosures for splices and terminations. Consequently, wiring for Class 1 circuits must be installed by a licensed electrical professional. By contrast, Class 2 circuits under the NEC typically operate at lower power levels (e.g., up to 100 VAC, no more than 60 VDC). The wiring used for Class 2 circuits under the NEC does not need to be run in raceways, conduit, and/or enclosures for splices and terminations. Specifically, the NEC defines a Class 2 circuit as that portion of a wiring system between the load side of a Class 2 power source and the connected equipment. Due to its power limitations, a Class 2 circuit is considered safe from a fire initiation standpoint and provides acceptable protection from electrical shock. Consequently, wiring for Class 2 circuits can be installed by someone other than a licensed electrical professional. Further, wiring used in Class 2 circuits does not need to be disposed within conduit, cable trays, or other types of cable conveyance devices.

As another example, the International Electrotechnical Commission (IEC) sets and maintains multiple standards and categorizations of electrical supply for a system. One such categorization is separated or safety extra-low voltage (SELV) is an electrical system in which the voltage cannot exceed 25 V AC RMS (root-mean-square) (35 V AC peak) or 60 V DC under dry, normal conditions, and under single-fault conditions, including earth faults in other circuits. Another such categorization, protected extra-low voltage (PELV), is an electrical system in which the voltage cannot exceed 25 V AC RMS (35 V AC peak) or 60 V DC under dry, normal conditions, and under single-fault conditions, except earth faults in other circuits. Yet another such categorization, functional extra-low voltage (FELV), is an electrical system in which the voltage cannot exceed 25 V AC RMS (35 V AC peak) or 60 V DC under normal conditions.

Example embodiments of EBPs for low voltage systems will be described more fully hereinafter with reference to the accompanying drawings, in which example embodiments of EBPs for low voltage systems are shown. EBPs for low voltage systems may, however, be embodied in many different forms and should not be construed as limited to the example embodiments set forth herein. Rather, these example embodiments are provided so that this disclosure will be thorough and complete, and will fully convey the scope of EBPs for low voltage systems to those of ordinary skill in the art. Like, but not necessarily the same, elements (also sometimes called components) in the various figures are denoted by like reference numerals for consistency.

Terms such as "first" and "second" are used merely to distinguish one component (or part of a component or state of a component) from another. Such terms are not meant to denote a preference or a particular orientation, and are not meant to limit embodiments of EBPs for low voltage systems. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 2:
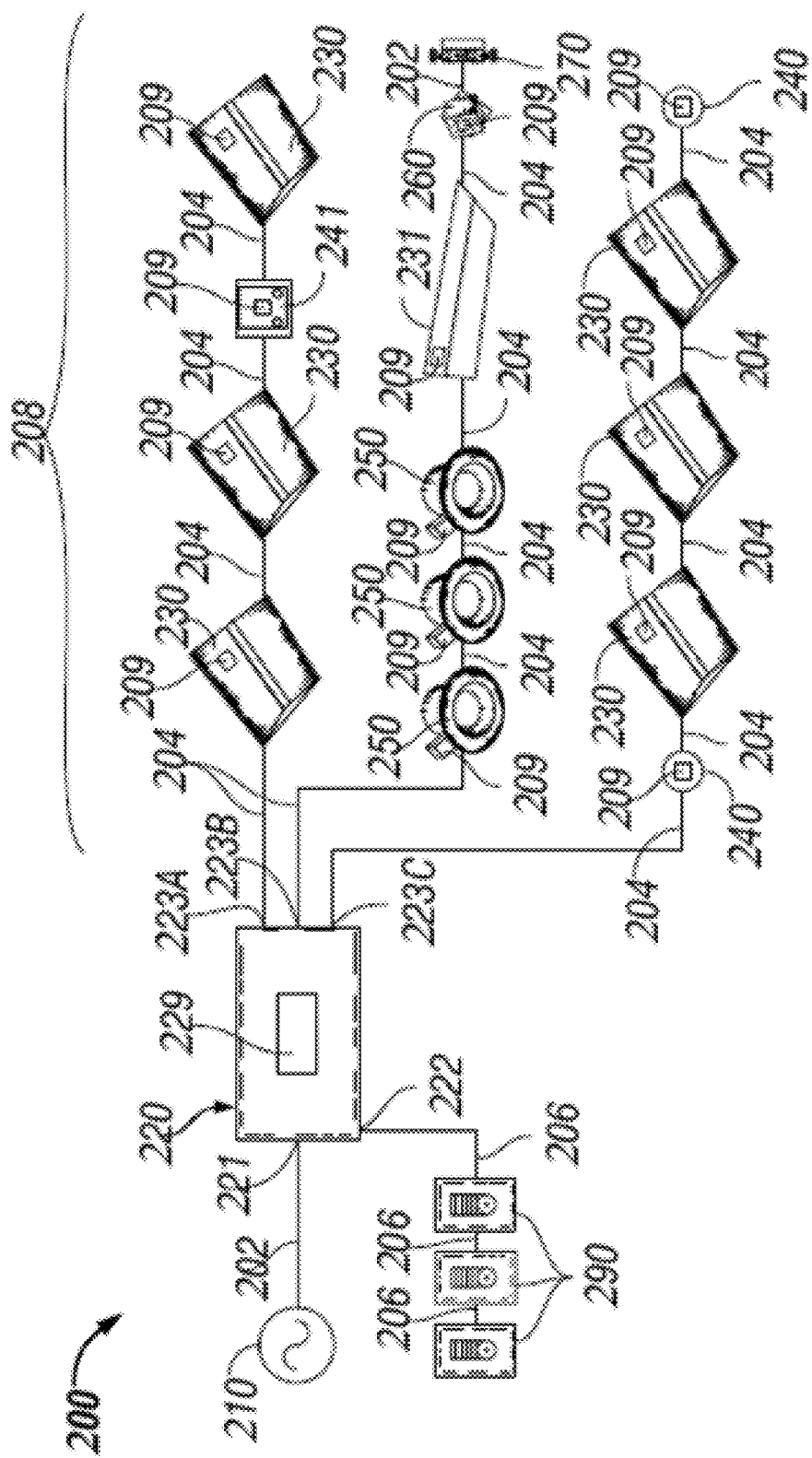

FIGS. 1 and 2 show system diagrams of distributed low voltage power systems for which example emergency battery packs can be used. The system 100 of FIG. 1 includes a power distribution module 120 (PDM 120), a power source 110, a number (in this case, four) of troffer lights 130, a number (in this case, three) of can lights 150, a number (in this case, one) of sensing devices 140, and a number (in this case, one) of controllers 190. The power source 110 is coupled to the PDM 120 using one or more line voltage cables 102. The PDM 120 and all of the other components of the system 100 are electrically coupled (directly or indirectly) to each other by a number of low-voltage (LV) cables 104.

In some cases, the PDM 120 can be coupled to one or more components (in this case, the controller 190) of the system 100 using one or more communication links 106. The communication link 106 can include a LV cable 104, Ethernet cable, and/or some other wired technology. In addition, or in the alternative, the communication link 106 can include a network using wireless technology (e.g., Wi-Fi, Zigbee, 6LoPan). The controller 190 can be coupled to one or more other systems in addition to the PDM 120 of the system 100. Similarly, the PDM 120 can be coupled to one or more other PDMs in one or more other systems. The system 100 can have multiple PDMs 120, where each PDM 120 of the system 100 provides LV power and communicates (sends and receives data) with each other, a controller 190, and/or one or more LV devices 108. In some cases, the controller 190 can be part of the PDM 120 rather than a separate component of the system 100.

Operational components of the system 100 (or any system described herein), such as the troffer lights 130, the can lights 150, and the sensing devices 140, can be referred to generally as "LV devices 108". The example LV devices 108 shown in FIG. 1 are not meant to be limiting. Examples of other LV devices 108 that can receive and use (directly or indirectly) LV signals from the PDM 120 can include, but are not limited to, a power source (e.g., a LED driver, a ballast, a buck converter, a buck-boost converter), a controller (e.g., a pulse width modulator, a pulse amplitude modulator, a constant current reduction dimmer), a keypad, a touchscreen, a dimming switch, a thermostat, a shade controller, a universal serial bus charger, and a meter (e.g., water meter, gas meter, electric meter).

The sensing device 140 can be any device that detects one or more conditions. Examples of a sensing device 140 can include, but are not limited to, a photocell, a motion detector, an audio detector, a pressure detector, a temperature sensor, and an air flow sensor. The controller 190 can be any device that controls one or more of the other devices in the system 100. Examples of a controller 190 can include, but are not limited to, a thermostat, a dimmer switch, a control switch, a control panel, and a power switch.

The power source 110 generates and/or delivers electrical power (called line voltage power herein) to the PDM 120. The line voltage power is at a higher voltage (and in some cases a different type (e.g., DC voltage, AC voltage)) than the voltage delivered by the PDM 120 to the various LV devices (e.g., troffer lights 130, can lights 150, sensing device 140) in the system 100. The line voltage power is a power that is typically delivered to a house, building, or other similar structure that supplies electricity located within or proximate to such structure. The power source 110 can also generate DC power.

Examples of voltages generated by the power source 110 can include 120 VAC, 240 VAC, 277 VAC, and 480 VAC. If the line voltage power is AC power, the frequency can be 50 Hz, 60 Hz, or some other frequency. Examples of a power source 110 can include, but are not limited to, a battery, a solar panel, a wind turbine, a power capacitor, an energy storage device, a power transformer, a fuel cell, a generator, and a circuit panel. As defined herein, a line voltage includes any of a number of voltages that is typically at least as great as the maximum LV signal (described below), and that is typically a nominal service voltage such as 120 VAC, 277 VAC, or 480 VDC.

The line voltage power is sent, directly or indirectly, from the power source 110 to the PDM 120 using the line voltage cables 102. The line voltage cables 102 can include one or more conductors made of one or more electrically conductive materials (e.g., copper, aluminum). The size (e.g., gauge) of the line voltage cables 102 (and/or conductors therein) are sufficient to carry the line voltage power of the power source 110. Each line voltage cable 102 may be coated with an insulator made of any suitable material (e.g., rubber, plastic) to keep the electrical conductors electrically isolated from any other conductor in the line voltage cable 102. Any components (e.g., power source 110) of the system 100 that are coupled to the line voltage cables 102 can be considered part of a Class 1 circuit.

In certain example embodiments, one or more of the LV devices 108 (in this case, the light troffers 130, the can lights 150, the sensing device 140, and the controller 190) in the system 100 that receive the LV power from the PDM 120 use an amount and/or type (e.g., DC, AC) of power that is different from the amount and type of line voltage power generated by the power source 110. For example, the line voltage power can be AC power, and the LV devices 108 of the system 100 require DC power to operate. In some cases, if the PDM 120 does not convert the line voltage power to the specific amount and/or type required at one or more LV devices 108, the LV device 108 can include a local power transfer device (not shown). A local power transfer device can be used to receive LV power from a LV cable 104 and to output the appropriate LV power (also called a LV signal) that can be used by the associated LV device 108. As defined herein, a LV signal has a voltage that does not exceed approximately 42.4 VAC (root mean square) or 60 VDC.

The aforementioned power transfer device can be substantially similar to the power transfer device 129 of the PDM 120, described below. The power transfer device can include one or more of a number of components that alter the amount and/or a type of the line voltage power. Such components can include, but are not limited to, a transformer (for raising or lowering a level of AC power), a rectifier (for generating DC power from AC power), and an inverter (for generating AC power from DC power). The power transfer device can include solid state components and/or discrete components (e.g., resistors, capacitors, diodes).

In some cases, a power transfer device associated with a LV device can be called a point-of-load (POL) control device 109 (also called a POL controller 109). Each POL control device 109 (also called, among other names, a driver, a POL driver, or a ballast) is usually located within a housing of the LV device 108 and is designed to receive a LV signal. When a LV signal is received by the POL control device 109, the POL control device 109 provides power regulation and control to the LV device 108. Each POL control device 109 currently used in the art has only a single output channel, and so only enables a single function (e.g., dimming, enable a particular color light) of a single LV device 108.

As stated above, the various LV devices 108 of FIG. 1 are each electrically coupled, directly or indirectly, to the PDM 120 using one or more LV cables 104. The PDM 120 can include a power transfer device 129 that generates, using the line voltage signal generated by the power source 110, one or more of a number of LV signals for one or more of the LV devices 108 in the system 100. The PDM 120 can have an input portion (e.g., input channel 121), an output portion (e.g., output channel 123), an input/output channel (e.g., input/output channel 122 or I/O channel 122), and the power transfer device 129. The power transfer device 129 of the PDM 120 can be essentially the same as the power transfer device 109 described above for the LV devices 108.

In certain example embodiments, the input portion of the PDM 120 can include one or more input channels 121 that receive the line voltage power from the power source 110. When the PDM 120 has multiple input channels 121, each input channel 111 can have the same, or different, amount and/or type of line voltage as the other input channels 121 of the PDM 120. The output portion of the PDM 120 can include one or more of a number (e.g., one, two, five, ten) of output channels (e.g., output channel 123), where each output channel of the output section delivers one or more LV signals for use by one or more LV devices 108 of the system 100 that are electrically coupled to that output channel of the output portion of the PDM 120.

The amount and/or type of power of the LV signal of one output channel of the PDM 120 can be substantially the same as, or different than, the amount and/or type of power of the LV signal of another output channel of the output portion of the PDM 120. For example, each output channel of the PDM 120 can output 100 W, 48 VDC of power (also called the LV signal). The LV signals delivered by an output channel of the PDM 120 can be at a constant level and/or a variable level. The LV signals can change a state (e.g., on, off, dim, standby) of one or more devices. In addition, or in the alternative, the LV signal can send data (e.g., instructions, requests, information, status).

In certain example embodiments, one or more LV cables 104 are used to electrically couple, directly or indirectly, each of the LV devices 108 in the system 100 to the PDM 120. The LV cables 104 can have one or more pairs of conductors. Each pair of conductors of the LV cable 104 can deliver LV signals that represent power signals and/or communication signals. In some cases, a LV cable 104 has at least one pair of conductors that carries power signals and at least one pair of conductors that carries control signals. The LV cables 104 can be plenum rated. For example, one or more of the LV cables 104 can be used in drop ceilings without conduit or cable trays.

The PDM 120 can also communicate, using an I/O channel (in this case, I/O channel 122) with one or more controllers 190 using a communication link 106. In such a case, the controller 190 can communicate with (e.g., send instructions to, receive data about one or more LV devices 108 from) the PDM 120. Instructions sent by the controller 190 to the PDM 120 can affect the operation of all devices coupled to one or more particular channels of the PDM 120, particular devices coupled to one or more particular channels of the PDM 120, or any combination thereof. Communication between the PDM 120, the controller 190, and the controllers in one or more devices of the system 100 can include the transfer (sending and/or receiving) of data. Communications between the PDM 120, the controller 190, and/or a LV device 108 can be made through the LV cables 104 and/or the communication link 106, using wired and/or wireless technology.

Such data can include instructions, status reports, notifications, and/or any other type of information. Specific examples of data and/or instructions sent between the PDM 120, the controller 190, and/or a LV device 108 can include, but are not limited to, a light level, a light fade rate, a demand response, instantaneous power consumption of a LV device 108, occupancy of an area, detection of daylight, a security override, a temperature, a measurement of power, a measurement or calculation of power factor, operational status, a mode of operation, a dimming curve, a color and/or correlated color temperature (CCT), a manual action, manufacturing information, performance information, warranty information, air quality measurements, upgrade of firmware, update of software, position of a shade, an a device identifier.

Communications between the PDM 120, the controller 190, and/or a LV device 108 can be based on one or more of a number of factors. For example, communications can be based on an algorithm or formula set forth in software and/or hardware within one or more components of the system 100. As another example, communications can be based on events associated with a LV device 108 or other component of the system. Such events can include, but are not limited to, change in power consumption, light intensity, an emergency condition, demand response, passage of time, and a time sweep.

In certain example embodiments, the PDM 120 can include communication and diagnostic capabilities. Communications can be with the controller 190, one or more devices coupled to the PDM 120, other PDMs 120 in the system 100, a user device, and/or any other component of the system 100. Diagnostic capabilities can be for historical and instantaneous power consumption of the LV devices 108 associated with a particular output channel of the PDM 120, for operations of the system 100 overall, for operations of the PDM 120, for operations of one or more LV devices 108 coupled to the PDM 120, for operations of one or more other PDMs in the system 100, and/or for any other components of the system 100. Any components (e.g., LV devices 108) of the system 100 that are coupled to the LV cables 104 can be considered part of a Class 2 circuit.

The PDM 120, the controller 190, and/or the POL controllers 109 of one or more LV devices 108 can include a hardware processor-based component that executes software instructions using integrated circuits, discrete components, and/or other mechanical and/or electronic architecture. In addition, or in the alternative, the PDM 120, the controller 190, and/or the POL controllers 109 of one or more LV devices 108 can include one or more of a number of non-hardware-based components. An example of such a non-hardware-based components can include one or more field programmable gate arrays (FPGA). Another example of such a non-hardware-based components can include one or more insulated-gate bipolar transistors (IGBTs). Yet another example of such a non-hardware-based components can include one or more integrated circuits (ICs).

Using FPGAs, IGBTs, ICs, and/or other similar devices known in the art allows the PDM 120, the controller 190, and/or the POL controllers 109 of one or more LV devices 108 to be programmable and function according to certain logic rules and thresholds without the use, or with limited use, of a hardware processor. As discussed below, the PDM 120 can also have one or more of a number of other hardware and/or software components, including but not limited to a storage repository, memory, an application interface, and a security module. Similarly, the controller 190 and/or a POL control module 109 of one or more LV devices 108 in the system 100 can include one or more software and/or hardware components, including but not limited to those listed above for the PDM 120.

The system 200 of FIG. 2 is substantially the same as the system 100 of FIG. 1, except that the PDM 220 that has three output channels 223 instead of one. One output channel 223A of the PDM 220 provides LV signals in series to two troffer lights 230, a photocell/timer 241, and another troffer light 230. Another output channel 223B of the PDM 220 provides LV signals in series to three can lights 250, a different troffer light 231, and an inverter 260, which feeds AC power to a wall outlet 270 using a line voltage cable 202. The third output channel 223C of the PDM 220 provides LV signals in series to a motion sensor 240, three light troffers 230, and another motion sensor 240. The I/O channel 222 in this case is coupled to three controllers 290 connected in series using communication links 206.

Figure 3:
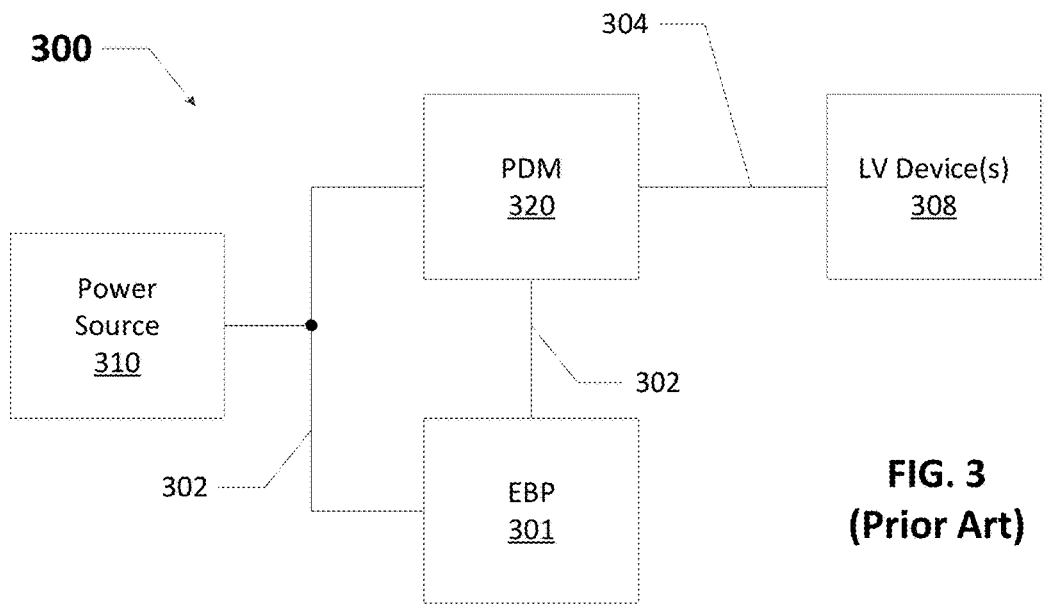
FIG. 3 shows a diagram of a power system with an emergency battery pack currently used in the art.

FIG. 3 shows a diagram of a power system 300 with an emergency battery pack 301 currently used in the art. Referring to FIGS. 1-3, the power source 310 sends high voltage power (Class 1) through line voltage cables 302 to both a PDM 320 and the EBP 301. At least one LV device 308 (a Class 2 device) is coupled to an output channel of the PDM 320 using LV cables 304.

During normal conditions, the PDM 320 receives the high voltage power from the power source 310, uses the high voltage power to create LV signals, and sends the LV signals to the LV device 308 through the LV cables 304. Simultaneously, the EBP 301 receives the high voltage power from the power source 310 through the line voltage cables 302 and uses the high voltage power to keep its battery units charged. When the high voltage power delivered by the power source 301 to the PDM 320 and the EBP 301 is interrupted, the EBP 301 provides alternative high voltage power to the PDM 320 using the charge stored in the battery units of the EBP 301 through a high voltage cable 302. In this way, the PDM 320 can continue to create and provide the LV signals to the LV device 308 through the LV cables 304, even when the power source 310 fails to provide the high voltage power.

Figure 4:
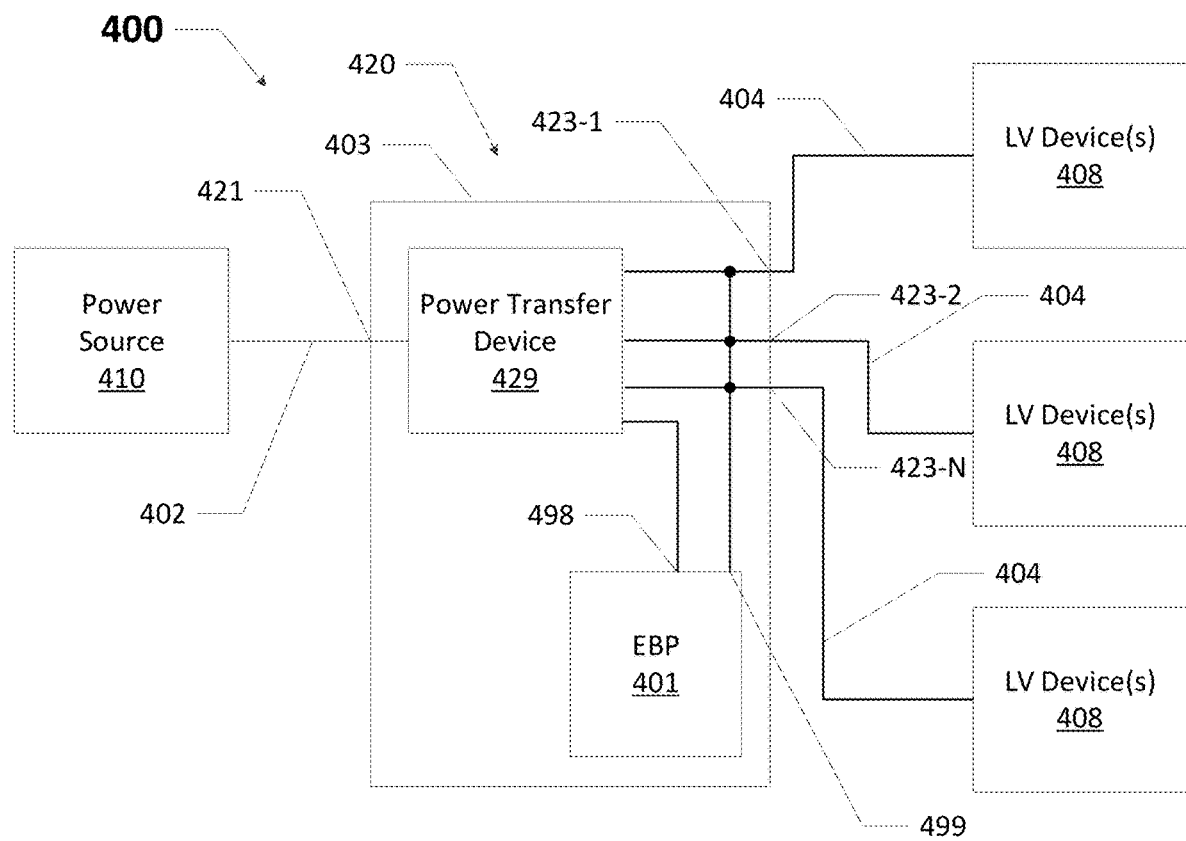
FIG. 4 shows a system diagram that includes an emergency battery pack in accordance with certain example embodiments.
Figure 5:
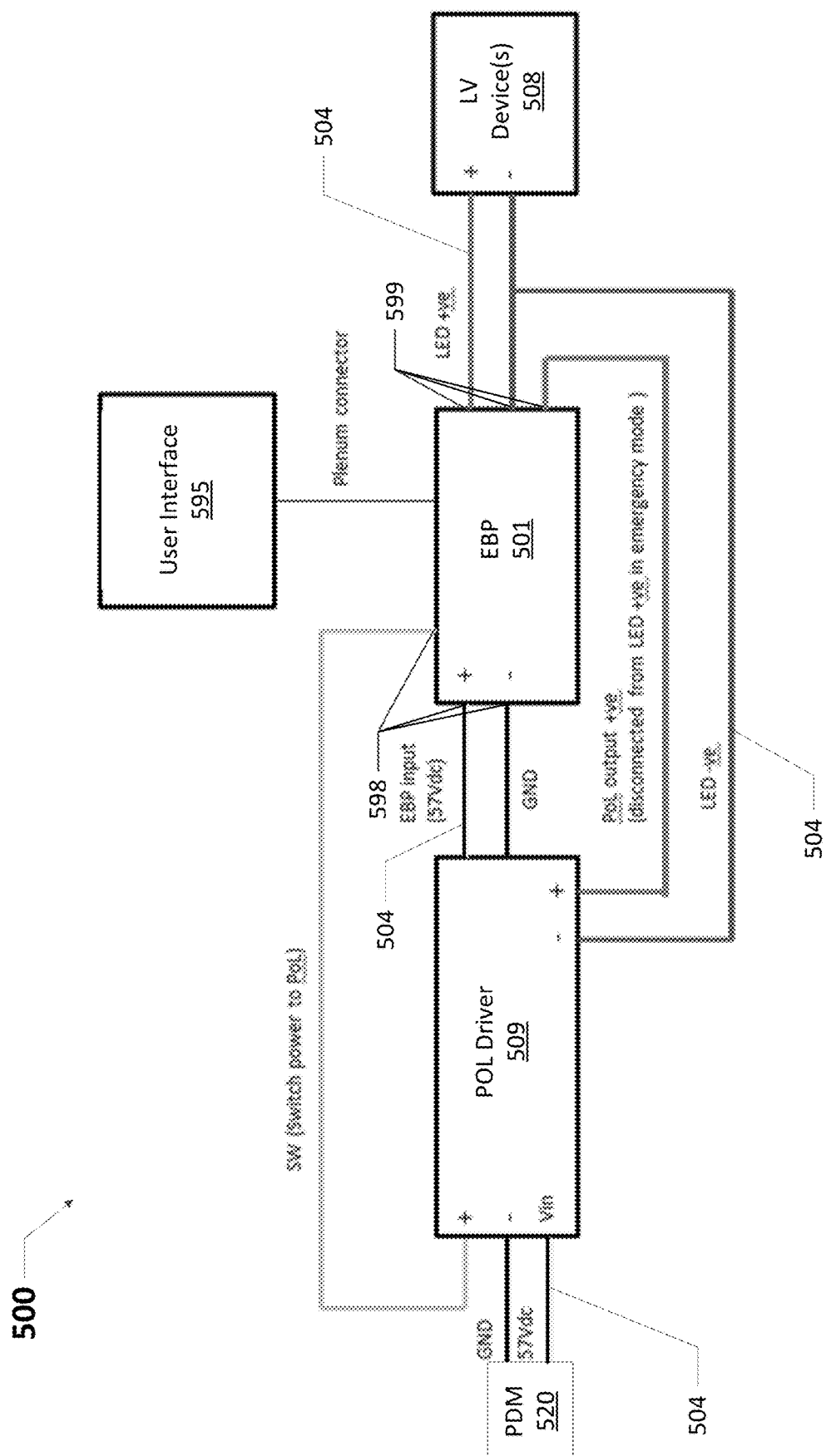
FIG. 5 shows another system diagram that includes an emergency battery pack in accordance with certain example embodiments.

FIGS. 4 and 5 each show a system diagram that includes an emergency battery pack in accordance with certain example embodiments. Specifically, FIG. 4 shows a system 400 that includes a EBP 401 that uses LV signals received from a power transfer device 429 of a PDM 420 to charge its battery units. FIG. 5 shows a system 500 that includes a EBP 501 that uses LV signals received from a POL driver 509 (a power supply of a POL controller) to charge its battery units.

Referring to FIGS. 1-5, the EBP 401 of the system 400 in FIG. 4 is shown as being part of the PDM 420. Alternatively, the EBP 401 can be a separate component located outside the housing 403 of the PDM 420. In any event, the input channel 498 of the EBP 401 receives LV power from one of the output channels (in this case, output channel 423-X) and uses the LV power to charge its battery units. When the EBP 401 stops receiving the LV power from the power transfer device 429 of the PDM 420, that is a strong indication that the line voltage power delivered from the power source 410 to the PDM 420 has been interrupted.

Consequently, when the input channel 498 of the EBP 401 stops receiving the LV power from the power transfer device 429 of the PDM 420, the EBP 401 automatically uses the LV power stored in its battery units to provide LV power, using the output channel 499, to the various output channels 423 (e.g., output channel 423-1, output channel 423-2, output channel 423-N) of the PDM 420. Once the output channels 423 of the PDM 420 receive the LV power from the output channel 499 of the EBP 401, the LV power reaches the various LV devices 408 through the LV cables 404.

As shown in FIG. 4, the EBP 401 can have a single output channel 499 that is electrically coupled to all of the output channels 423 of the PDM 420. Alternatively, the EBP 401 can have multiple output channels 499, where each output channel 499 of the EBP 401 is electrically coupled to a corresponding output channel 423 of the PDM 420. In either of these cases, a switch, relay, and/or other devices can be used to properly channel LV power from the output channel(s) 499 of the EBP 401 to the one or more output channels 423 of the PDM 420 that were actively serving LV devices 408 at the time that the power transfer device 429 stopped receiving line voltage power from the power source 410.

As yet another alternative, the EBP 401 can have multiple input channels 498 and multiple output channels 499. For example, the EBP 401 can have the same number of input channels 498 and output channels 499 as the number of output channels 423 of the PDM 420. In such a case, each output channel 423 of the power transfer device 429 of the PDM 420 can be coupled to both a LV device 408 and an input channel 498 of the EBP 401. Similarly, each output channel 499 of the EBP 401 can be coupled to an output channel 423 of the PDM 420 and a corresponding LV device 408. In this way, switching may not be needed as an output channel 499 of the EBP 401 would only release power if the corresponding input channel 498 of the EBP 401 was delivering power to the EBP 401 immediately prior to an interruption of the line voltage power to the PDM 420.

The EBP 501 in the system 500 of FIG. 5 differs from the EBP 401 in the system 400 of FIG. 4 in that the input channel 598 of the EBP 501 receives the LV signal (e.g., 57 VDC) to charge its battery units from a POL driver 509. The POL driver 509 can be part of a POL controller that provides distributed power and/or control to one or more LV devices 508. The POL driver 509 can receive power (e.g., an LV signal) from any of a number of sources, including but not limited to a PDM 520. In this case, the EBP 501 can include, or be coupled to, a user interface 595. The user interface 595 can provide information to a user by way of, for example, an indicating light. In addition, or in the alternative, the user interface 595 can receive instructions from a user by way of, for example, a test button, a laser input, and a battery disconnect switch. In this way, the user interface 595 provides feedback to a user regarding the status (e.g., level of charge, whether the EBP 501 is releasing reserve LV signals to the LV devices 508, the functionality, indication of malfunction) of the EBP 501, including any portions thereof.

Figure 6A:
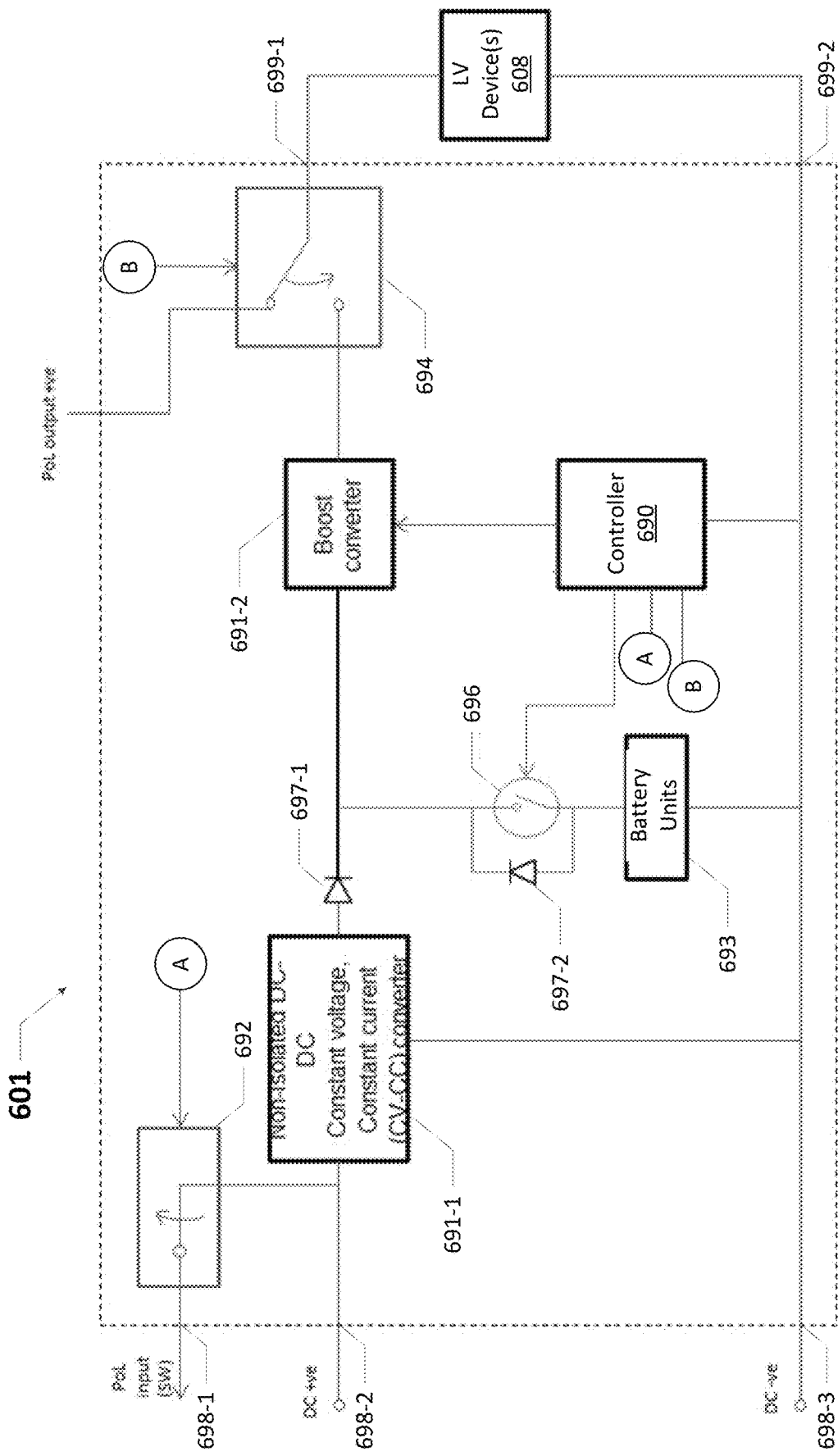
FIG. 6A shows a system diagram of an emergency battery pack in accordance with certain example embodiments.
Figure 6B:
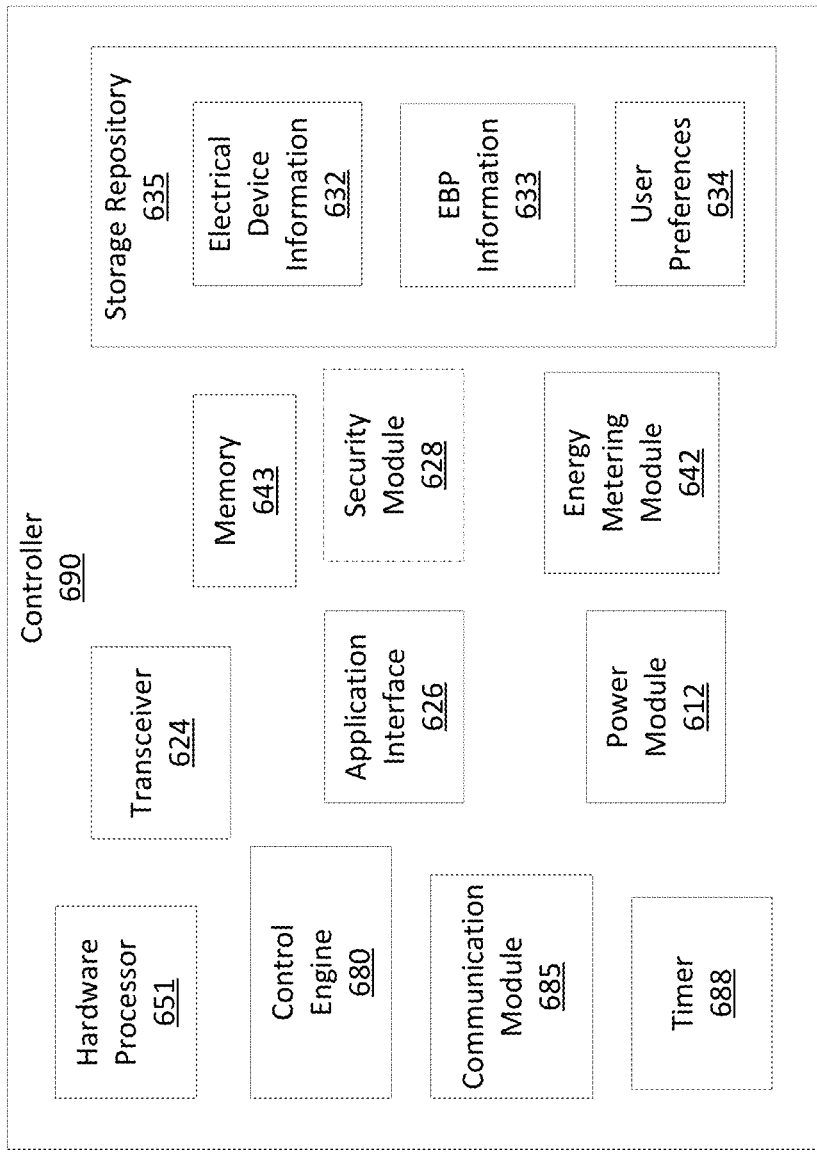
FIG. 6B shows a system diagram of a controller for the emergency battery pack of FIG. 6A in accordance with certain example embodiments.

FIG. 6A shows a system diagram of an emergency battery pack 601 in accordance with certain example embodiments. FIG. 6B shows a system diagram of a controller 690 for the emergency battery pack 601 of FIG. 6A in accordance with certain example embodiments. Referring to FIGS. 1-6B, the EBP 601 of FIG. 6A can include one or more of a number of components. For example, as shown in FIG. 6A, the EBP 601 can include an EBP power supply 691, an EBP controller 690, one or more switches (switch 692, switch 694, switch 696), one or more diodes 697, and one or more battery units 693. Some or all of these components can be located within an optional housing 695 of the EBP 601.

In certain example embodiments, the EBP power supply 691 of the EBP 601 is substantially similar to a power transfer device (e.g., power transfer device 439) of a PDM (e.g., PDM 420). Specifically, the EBP power supply 691 receives LV signals that flow through the input channel 698 of the EBP 601 and creates a type and level of power that is used by the EBP controller 690 to operate. In addition to the EBP power supply 691, switch 692 receives the LV signals that flow through one or more of the input channels 698.

As discussed above with respect to the PDM, the EBP power supply 691 of the EBP 601 can include one or more of a number of components. For example, in this case, the EBP power supply 691 can include a non-isolated DC-DC constant voltage constant current converter 691-1 (also called a non-isolated charger stage 691-1) for the LV signal received by the battery units 693 and a boost converter 691-2 (also called a boost stage 691-2) for the reserve LV signal released by the battery units 693. In this example, the non-isolated charger stage 691-1 manipulates (e.g., transforms, inverts, converts) the LV power received at the input terminals 698 into a voltage of the type (e.g., DC, AC) and level (e.g., 24V, 12V) used by the battery units 693. Also, in this example, the boost stage 691-2 manipulates the reserve LV power released by the battery units 693 into a voltage of the type and level used by the LV devices 608.

The EBP 601 can have one or more of a number of input channels 698 to sending and/or receiving signals (e.g., power, control, communication) with one or more upstream devices (e.g., POL controller, PDM) in the system. In this case, the EBP 601 has three input channel 698: Input channel 698-1, input channel 698-2, and input channel 698-3. Input channel 698-1 provides an input signal to switch 692 from a POL controller. Input channel 698-2 provides a positive leg of DC voltage to the non-isolated charger stage 691-1 of the EPB power supply 691. Input channel 698-3 provides a negative leg of DC voltage to a number of components (e.g., to the non-isolated charger stage 691-1 of the EPB power supply 691, the battery units 693, the EBP controller 690) of the EPB 601.

In certain example embodiments, an input channel 698 of the EBP 601 is not connected to an output channel (e.g. a driver output) of a PDM, a POE switch, a POL controller, or some other component of a system. Instead, the input channel 698 of the EBP 601 is connected to some other output (e.g., a serial port) of a PDM, a POE switch, a POL controller, or some other component of a system that is used for purposes of, for example, providing power to one or more sensors or providing power to a push-button wall station. In this way, the EBP 601 does not sense the LV bus presence, but instead is directly connected to a low-power output that is always "hot".

Switch 692 is used to channel LV signals (as received, for example, from a PDM via input channel 698-2) to the battery units 693 when the battery units 693 need charging. Switch 692 can be any type of device (e.g., transistor, dipole switch, relay contacts) that can open and close (change state or change position) based on certain conditions. For example, switch 692 can close when LV signals are received at input terminal 698-1, and can open when LV signals are interrupted at input terminal 698-1. In certain example embodiments, as shown in FIG. 6A, the switch 692 can operate (e.g., change from a closed position to an open position, change from an open position to a closed position) based on input from the EBP controller 690. As an example, for an initial period of time (e.g., 24 hours), switch 692 remains closed, and thereafter switch 692 will operate in conjunction with the square wave of the duty cycle. Alternatively, the state of the switch 692 can be controlled by some other component (e.g., a PDM, a POL controller) of a system.

A battery unit 693 can be any number of rechargeable batteries that are configured to charge using the LV signal. In some cases, one or more of the battery units 693 charge using a different level and/or type of power relative to the level and type of power of the LV signal. In such a case, the EBP power supply 691 (in this case, more specifically, the non-isolated charger stage 691-1 of the EBP power supply 691) can convert the LV signals to the level and type of power used to charge the battery units 693. There can be any number of battery units 693. The battery units 693 can use one or more of any number of battery technologies. Examples of such technologies can include, but are not limited to, nickel-cadmium, nickel-metalhydride, lithium-ion, and alkaline. In certain example embodiments, each battery unit 693 is rechargeable.

Switch 696 can be used to allow LV signals discharged by the battery units 693 to flow to the boost stage 691-2 of the EBP power supply 691. In certain example embodiments, switch 696 is open (preventing the battery units 693 from charging or discharging) during certain times (e.g., when the battery units 693 are fully charged and the LV signals continue to be received at the input channels 698) and closed (allowing the battery units 693 to discharge) during other times (e.g., when LV signals are not received at the input channels 698). For example, switch 696 can open when the battery units 693 do not need charging and can close when the battery units 693 need charging. Switch 696 can be any type of device (e.g., transistor, dipole switch, relay contacts) that changes state based on certain conditions. In certain example embodiments, the switch 696 can operate (e.g., change from a closed position to an open position, change from an open position to a closed position) based on input from the EBP controller 690.

Switch 696 can be complemented with one or more of a number of components. For example, as shown in FIG. 6A, a diode 697-2 can be placed in parallel with switch 696. In such a case, reserve LV signal can be discharged from the battery units 693 to the boost stage 691-2 of the EBP power supply 691, even when switch 696 is in the open position (also called an open state). Similarly, one or more portions of the EBP power supply 691 can be complemented with one or more of a number of components. For example, as shown in FIG. 6A, a diode 697-1 can be placed between the non-isolated charger stage 691-1 and the terminal point where the boost stage 691-2 of the EBP power supply 691 is connected in parallel with the battery units 693. In such a case, when reserve LV signals are released by the battery units 693, it does not flow back into the non-isolated charger stage 691-1, but rather flows to the boost stage 691-2.

Switch 694 is used to allow reserve LV signals discharged by the battery units 693 and processed by the boost converter 691-2 of the EBP power supply 691 to flow to one or more of the output channels 699 of the EBP 601. In certain example embodiments, switch 694 is open (preventing the reserve LV signals from reaching the output channels 699) during times when LV signals are received at the input channel 698 and closed (allowing the reserve LV signals to reach the output channels 699) during times when LV signals are not received at the input channel 698. Switch 694 can be any type of device (e.g., transistor, dipole switch, relay contacts) that changes state based on certain conditions. In certain example embodiments, the switch 694 can operate (e.g., change from a closed position to an open position, change from an open position to a closed position) based on input from the EBP controller 690.

In certain example embodiments, the EBP controller 690 monitors the flow of LV signals received at the input channel 698 and controls when the power stored in the battery units 693 is discharged through the output channel 699. The EBP controller 690 can control one or more components (e.g., switch 692, switch 694, switch 696) to execute its functions. The EBP controller 690 can be autonomous, self-learning, reporting, controlled by a user, controlled by a network manager, and/or operate in any of a number of other modes.

In certain example embodiments, as shown in FIG. 6B, the controller 690 can include one or more of a number of components. Examples of such components can include, but are not limited to, a control engine 680, a communication module 685, a timer 688, a power module 612, an energy measurement module 642, a storage repository 635, a hardware processor 651, a memory 643, a transceiver 624, an application interface 626, and an optional security module 628. The controller 690 can correspond to a computer system 718 as described below with regard to FIG. 7.

The components shown in FIG. 6B are not exhaustive, and in some embodiments, one or more of the components shown in FIG. 6B may not be included in an example controller 690. Any component of the example controller 690 can be discrete or combined with one or more other components of the controller 690. In addition, the inclusion and/or location of one or more components can vary from what is shown in FIG. 6B. As an example, one or more of the switches (e.g., switch 696) can be part of the controller 690.

The energy metering module 642 of the controller 690 can monitor conditions of within the EBP 601 and/or of one or more of the LV devices 608 coupled to the output channel 699. Examples of such conditions can include, but are not limited to, power consumption of an LV device 608, a setting (e.g., dimming level, switch setting) of an electrical device 608, charge amount of one or more battery units 693, and characteristics of the LV signal output by the EBP power supply 691 (or portion thereof). In certain example embodiments, one or more LV devices 608 is coupled to an output channel 699 of the controller 690, and the energy metering module 642 measures power fed through the output channel 699. The LV devices 608 can be one or more LV devices 608 that are coupled (e.g., in series, in parallel) to one of the output channels 699 of the controller 690.

The energy metering module 642 of the controller 690 measures one or more components of power (e.g., current, voltage, resistance, VARs, watts) associated with the controller 690 and/or the LV devices 608 at one or more points in the system 600. The energy metering module 642 can include any of a number of measuring devices and related devices, including but not limited to a voltmeter, an ammeter, a power meter, an ohmmeter, a current transformer, a potential transformer, and electrical wiring. The energy metering module 642 can measure a component of power continuously, periodically, based on the occurrence of an event, based on a command received from the control engine 680, randomly, and/or based on some other factor. The energy metering module 642 and/or other components of the controller 690 can receive power, control, and/or communication signals from the EBP power supply 691 and/or the power module 612.

The controller 690 of the EBP 601 can interact (e.g., periodically, continually, randomly) with a LV device 608, a switch, a POL controller, a PDM, a user, and/or any other component within a system. The controller 690 can interact with such other components using the application interface 626 and the communication links 606 in accordance with one or more example embodiments. Specifically, the application interface 626 of the controller 690 receives data (e.g., information, communications, instructions) from and sends data (e.g., information, communications, instructions) to the other components of the system.

The controller 490, a LV device 608, a switch, a POL controller, a PDM, a user, and/or any other component within a system can use their own system or share a system in certain example embodiments. Such a system can be, or contain a form of, an Internet-based or an intranet-based computer system that is capable of communicating with various software. A computer system includes any type of computing device and/or communication device, including but not limited to the controller 690. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 7.

Further, as discussed above, such a system can have corresponding software (e.g., user software, controller software, LV device software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system.

The controller 690 can include a housing. The housing can include at least one wall that forms a cavity. The housing of the controller 690 can be used to house, at least in part, one or more components (e.g., power module 612, energy metering module 642) of the controller 690. For example, the controller 690 (which in this case includes the control engine 680, the communication module 685, the timer 688, the storage repository 635, the hardware processor 651, the memory 643, the transceiver 624, the application interface 626, and the optional security module 628) can be disposed within the cavity formed by a housing. In alternative embodiments, any one or more of these or other components of the controller 690 can be disposed on a housing and/or remotely from a housing.

The storage repository 635 can be a persistent storage device (or set of devices) that stores software and data used to assist the controller 690 in communicating with one or more other components of the system. In one or more example embodiments, the storage repository 635 stores optional LV device information 632, EBP information 633, and user preferences 634. The LV device information 632 can be any information associated with a LV device 408. Such information can include, but is not limited to, manufacturer's information of the LV device 608, age of the LV device 608, hours of operation of the LV device 608, historical peak demand of the LV device 608, historical energy usage of the LV device 608 during steady-state operation, communication protocols of the LV device 608, physical location of the LV device 608, and orientation of the LV device 608.

The EBP information 633 can be any information associated with the EBO 601. Such information can include, but is not limited to, formulas and/or algorithms, functional capabilities (number of output channels 699, power output of each output channel 699) of the EBP 601, physical location of the EBP 601, manufacturer of the EBP 601, age of the EBP 601, hours of operation of the EBP 601, and communication protocols of the EBP 601. The EBP information 633 can also include information about other EBPs that are communicably coupled to the EBP 601. The user preferences 634 can be any data associated the preferences of a particular user. Other information can be stored in the storage repository 635, including but not limited to information about one or more POL controllers and a PDM to which the EBP 601 is coupled.

Examples of a storage repository 635 can include, but are not limited to, a database (or a number of databases), a file system, a hard drive, flash memory, some other form of solid state data storage, or any suitable combination thereof. The storage repository 635 can be located on multiple physical machines, each storing all or a portion of the LV device information 632, EBP information 633, and/or the user preferences 634 according to some example embodiments. Each storage unit or device can be physically located in the same or in a different geographic location.

The storage repository 635 can be operatively connected to the control engine 680. In one or more example embodiments, the control engine 680 includes functionality to one or more other components in the system. More specifically, the control engine 680 sends information to and/or receives information from the storage repository 635 in order to communicate with one or more other components in the system. As discussed below, the storage repository 635 can also be operatively connected to the communication module 685 in certain example embodiments.

In certain example embodiments, the controller 690 compares the readings made by the energy metering module 642 with threshold values, operates one or more switches (e.g., switch 692, switch 694, switch 696), controls the EBP power supply 691, communicates with one or more other components (e.g., LV device 608, a POL controller, a PDM, a user) in the system. The controller 690 can also control, directly or indirectly, a setting of one or more LV devices 608 so that none of the circuits fed by the output channels 699 of the controller 690 overload and/or fall out of compliance with any applicable industry safety standards.

The control engine 680 of the controller 690 can manage the LV devices 608 being served by the EBP 601 so that the reserve LV signals generated by the battery units 693 of the EBP 601 is provided to the LV devices 608 efficiently, particularly during extended outage periods. In certain example embodiments, the control engine 680 of the controller 690 controls the operation of one or more components (e.g., the communication module 685, the transceiver 624) of the controller 690. For example, the control engine 680 can put the communication module 685 in "sleep" mode when there are no communications between the controller 690 and another component in the system or when communications between the controller 690 and another component in the system follow a regular pattern. In such a case, power consumed by the controller 690 is conserved by only enabling the communication module 685 when the communication module 685 is needed.

The control engine 680 can provide control, communication, and/or other similar signals to one or more other components of the system. Similarly, the control engine 480 can receive control, communication, and/or other similar signals from one or more other components of the system. The control engine 680 can control the EBP 601 or portions thereof (e.g., the EBP power supply 691) automatically (for example, based on one or more algorithms stored in the EBP information 633 of the storage repository 635) and/or based on control, communication, and/or other similar signals received from a controller of another component of the system. The control engine 680 may include a printed circuit board, upon which the hardware processor 651 and/or one or more discrete components of the controller 690 can be positioned.

In certain example embodiments, the control engine 680 can include an interface that enables the control engine 680 to communicate with one or more components (e.g., communication module 685) of the controller 690 and/or another component of the system. For example, if a LV device 608 is a light fixture, and if the EBP 601 operates under IEC Standard 62386, then the output channel 699 can include a digital addressable lighting interface (DALI). In such a case, the control engine 680 can also include a DALI to enable communication with the output channel 699 within the EBP 601. Such an interface can operate in conjunction with, or independently of, the communication protocols used to communicate between the controller 690 and another component of the system.

The control engine 680 can operate in real time. In other words, the control engine 680 of the controller 690 can process, send, and/or receive communications with another component of the system as any changes (e.g., discrete, continuous) occur within the system. Further, the control engine 680 of the controller 690 can, at substantially the same time, control the EBP 601 and/or one or more other components in the system based on such changes.

In addition, the control engine 680 of the controller 690 can perform one or more of its functions continuously. For example, the controller 690 can continuously communicate LV device information 632, EBP information 633, and/or any other information. In such a case, any updates or changes to such information (e.g., a change in power consumption measured by the energy metering module 642) can be used by the controller 690 in adjusting an output (e.g., current) sent by the EBP 601 to one or more output channels 699.

As yet another example, the control engine 680 can operate continuously to ensure that the total instantaneous power demand at any output channel 699 at any point in time is no greater than the maximum demand rating of that output channel 699. As yet another example, the control engine 680 can operate one or more of the switches (e.g., switch 696) based on measurements taken by the energy metering module 642.

In some cases, rather than operating a switch, the controller 690 can control one or more portions (e.g., the boost stage 691-2) of the EBP power supply 691 and/or a POL controller associated with a LV device 608. In other words, as an example, to reduce the amount of LV power fed to a LV device 608, the control engine 680 can adjust the output of the EBP power supply 691 feeding LV power to the LV device 608. As another example, the control engine 680 can send a control signal to a POL control device to require one or more LV devices 608 to consume a different amount of reserve LV power from the EBP 601.

In certain example embodiments, the control engine 680 of the controller 690 can operate (e.g., in real time) based on instructions received from a user, a change in power received by the EBP 601, based on power consumed by one or more LV devices 608, and/or based on some other factor. In addition, the control engine 680 (or other portion of the controller 690) can include the timer 688. In such a case, the timer 688 can measure one or more elements of time, including but not limited to clock time and periods of time. The timer 688 can also include a calendar in addition to clock functions.

In certain example embodiments, the control engine 680 of the controller 690 operates one or more of the switches of the EBP 601. The control engine 680 can operate the switches in a manner similar to what was described above with respect to FIG. 6A. The control engine 680 (or other components of the controller 690) can also include one or more hardware and/or software architecture components to perform its functions. Such components can include, but are not limited to, a universal asynchronous receiver/transmitter (UART), a universal synchronous receiver/transmitter (USRT), a serial peripheral interface (SPI), a direct-attached capacity (DAC) storage device, an analog-to-digital converter, an inter-integrated circuit (I²C), and a pulse width modulator (PWM).

In certain example embodiments, the communication module 685 of the controller 690 determines and implements the communication protocol (e.g., from the LV device information 632 and the EBP information 633 of the storage repository 635) that is used when the control engine 680 communicates with (e.g., sends signals to, receives signals from) another component in the system. In some cases, the communication module 685 accesses the LV device information 632 and/or the EBP information 633 to determine which communication protocol is within the capability of the recipient of a communication sent by the control engine 680. In addition, the communication module 685 can interpret the communication protocol of a communication received by the controller 690 so that the control engine 680 can interpret the communication.

The communication module 685 can send data directly to and/or retrieve data directly from the storage repository 635. Alternatively, the control engine 680 can facilitate the transfer of data between the communication module 685 and the storage repository 635. The communication module 685 can also provide encryption to data that is sent by the controller 690 and decryption to data that is received by the controller 690. The communication module 685 can also provide one or more of a number of other services with respect to data sent from and received by the controller 690. Such services can include, but are not limited to, data packet routing information and procedures to follow in the event of data interruption.

The power module 612 of the controller 690 provides power to one or more other components (e.g., timer 688, control engine 680) of the controller 690. In certain example embodiments, the power module 612 receives power from the EBP power supply 691. The power module 612 can include one or more of a number of single or multiple discrete components (e.g., transistor, diode, resistor), and/or a microprocessor. The power module 612 may include a printed circuit board, upon which the microprocessor and/or one or more discrete components are positioned. In some cases, the power module 612 can include one or more components that allow the power module 612 to measure one or more elements of power (e.g., voltage, current) that is delivered to and/or sent from the power module 612.

The power module 612 can include one or more components (e.g., a transformer, a diode bridge, an inverter, a converter) that receives power (for example, through an electrical cable) from a source (e.g., the EBP power supply 691) and generates power of a type (e.g., alternating current, direct current) and level (e.g., 12V, 24V, 470V) that can be used by the other components of the controller 690. The power module 612 can use a closed control loop to maintain a preconfigured voltage or current with a tight tolerance at the output. The power module 612 can also protect the rest of the electronics (e.g., hardware processor 651, transceiver 624) from surges generated in the line. In addition, or in the alternative, the power module 612 can be a source of power in itself to provide signals to the other components of the controller 690. For example, the power module 612 can be a battery. As another example, the power module 612 can be a localized photovoltaic power system.

The hardware processor 651 of the controller 690 executes software in accordance with one or more example embodiments. Specifically, the hardware processor 651 can execute software on the control engine 680 or any other portion of the controller 690, as well as software used by any other component of the system. The hardware processor 651 can be an integrated circuit, a central processing unit, a multi-core processing chip, a multi-chip module including multiple multi-core processing chips, or other hardware processor in one or more example embodiments. The hardware processor 651 is known by other names, including but not limited to a computer processor, a microprocessor, and a multi-core processor.

In one or more example embodiments, the hardware processor 651 executes software instructions stored in memory 643. The memory 643 includes one or more cache memories, main memory, and/or any other suitable type of memory. The memory 643 is discretely located within the controller 690 relative to the hardware processor 651 according to some example embodiments. In certain configurations, the memory 643 can be integrated with the hardware processor 651. In certain example embodiments, the controller 690 does not include a hardware processor 651. In such a case, the controller 690 can include, as an example, one or more FPGAs, one or more IGBTs, and/or one or more ICs. Using FPGAs, IGBTs, ICs, and/or other similar devices known in the art allows the controller 690 (or portions thereof) to be programmable and function according to certain logic rules and thresholds without the use of a hardware processor. Alternatively, FPGAs, IGBTs, ICs, and/or similar devices can be used in conjunction with one or more hardware processors 651.

The transceiver 624 of the controller 690 can send and/or receive control and/or communication signals. Specifically, the transceiver 624 can be used to transfer data between the controller 690 and other components of the system. The transceiver 624 can use wired and/or wireless technology. The transceiver 624 can be configured in such a way that the control and/or communication signals sent and/or received by the transceiver 624 can be received and/or sent by another transceiver that is part of another component of the system.

When the transceiver 624 uses wireless technology, any type of wireless technology can be used by the transceiver 624 in sending and receiving signals. Such wireless technology can include, but is not limited to, Wi-Fi, visible light communication, cellular networking, and Bluetooth. The transceiver 624 can use one or more of any number of suitable communication protocols (e.g., ISA100, HART) when sending and/or receiving signals. Such communication protocols can be dictated by the communication module 685. Further, any transceiver information for other components in the system can be stored in the storage repository 635.

Optionally, in one or more example embodiments, the security module 628 secures interactions between the controller 690 and other components of the system. More specifically, the security module 628 authenticates communication from software based on security keys verifying the identity of the source of the communication. For example, user software may be associated with a security key enabling the software of a user to interact with the controller 690. Further, the security module 628 can restrict receipt of information, requests for information, and/or access to information in some example embodiments.

Figure 7:
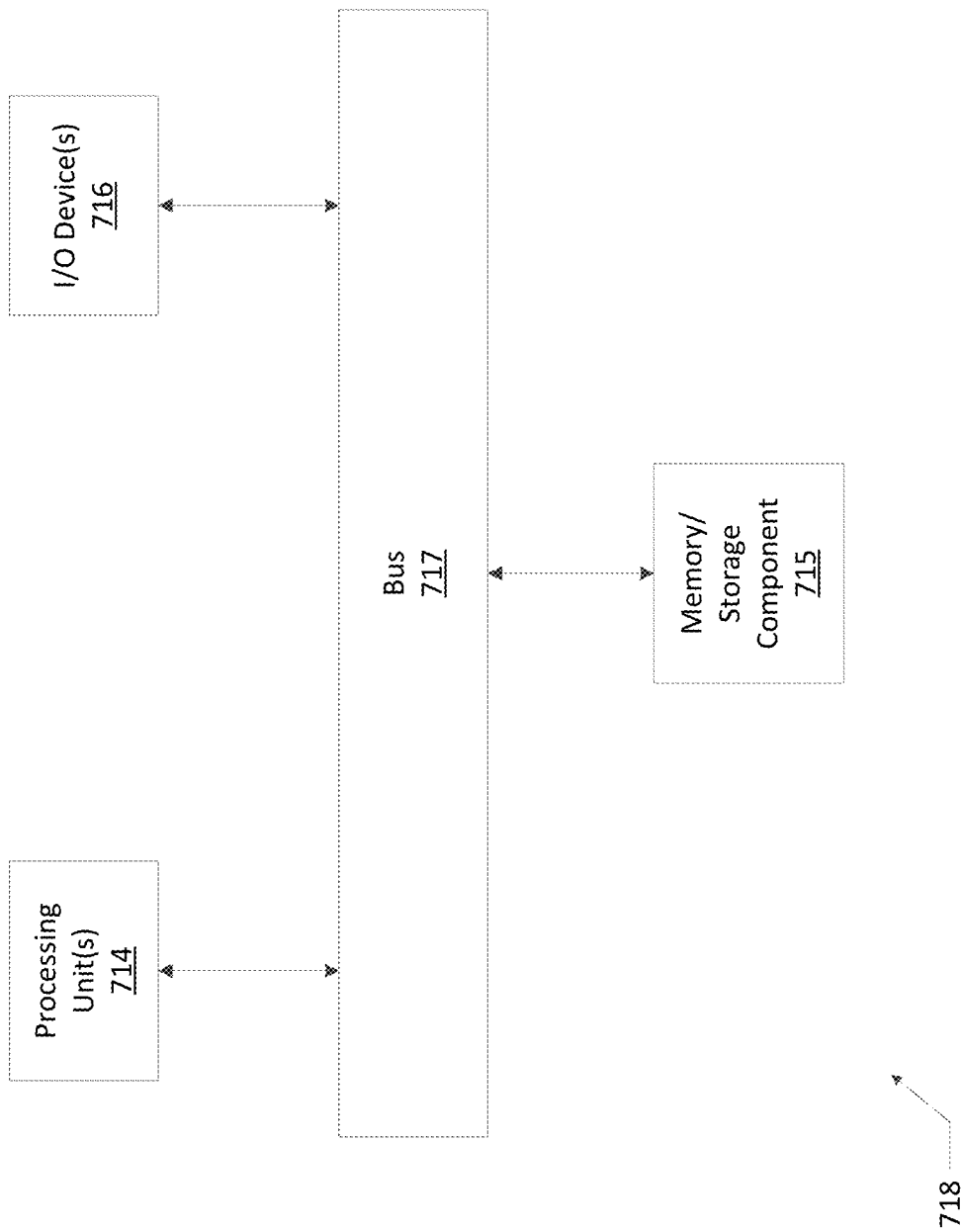
FIG. 7 shows a computing device in accordance with one or more example embodiments.

One or more of the functions performed by any of the components (e.g., EBP controller 690) of an example EBP (e.g., EBP 601) can be performed using a computing device 718. An example of a computing device 718 is shown in FIG. 7. The computing device 718 implements one or more of the various techniques described herein, and which is representative, in whole or in part, of the elements described herein pursuant to certain example embodiments. Computing device 718 is one example of a computing device and is not intended to suggest any limitation as to scope of use or functionality of the computing device and/or its possible architectures. Neither should computing device 718 be interpreted as having any dependency or requirement relating to any one or combination of components illustrated in the example computing device 718.

Computing device 718 includes one or more processors or processing units 714, one or more memory/storage components 715, one or more input/output (I/O) devices 716, and a bus 717 that allows the various components and devices to communicate with one another. Bus 717 represents one or more of any of several types of bus structures, including a memory bus or memory controller, a peripheral bus, an accelerated graphics port, and a processor or local bus using any of a variety of bus architectures. Bus 717 includes wired and/or wireless buses.

Memory/storage component 715 represents one or more computer storage media. Memory/storage component 715 includes volatile media (such as random access memory (RAM)) and/or nonvolatile media (such as read only memory (ROM), flash memory, optical disks, magnetic disks, and so forth). Memory/storage component 715 includes fixed media (e.g., RAM, ROM, a fixed hard drive, etc.) as well as removable media (e.g., a Flash memory drive, a removable hard drive, an optical disk, and so forth).

One or more I/O devices 716 allow a customer, utility, or other user to enter commands and information to computing device 718, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 718 is connected to a network (not shown) (e.g., a local area network (LAN), a wide area network (WAN) such as the Internet, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 718 includes at least the minimal processing, input, and/or output means necessary to practice one or more embodiments.

Further, those skilled in the art will appreciate that one or more elements of the aforementioned computer device 718 is located at a remote location and connected to the other elements over a network in certain example embodiments. Further, one or more embodiments is implemented on a distributed system having one or more nodes, where each portion of the implementation (e.g., EBP controller 690) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 8:
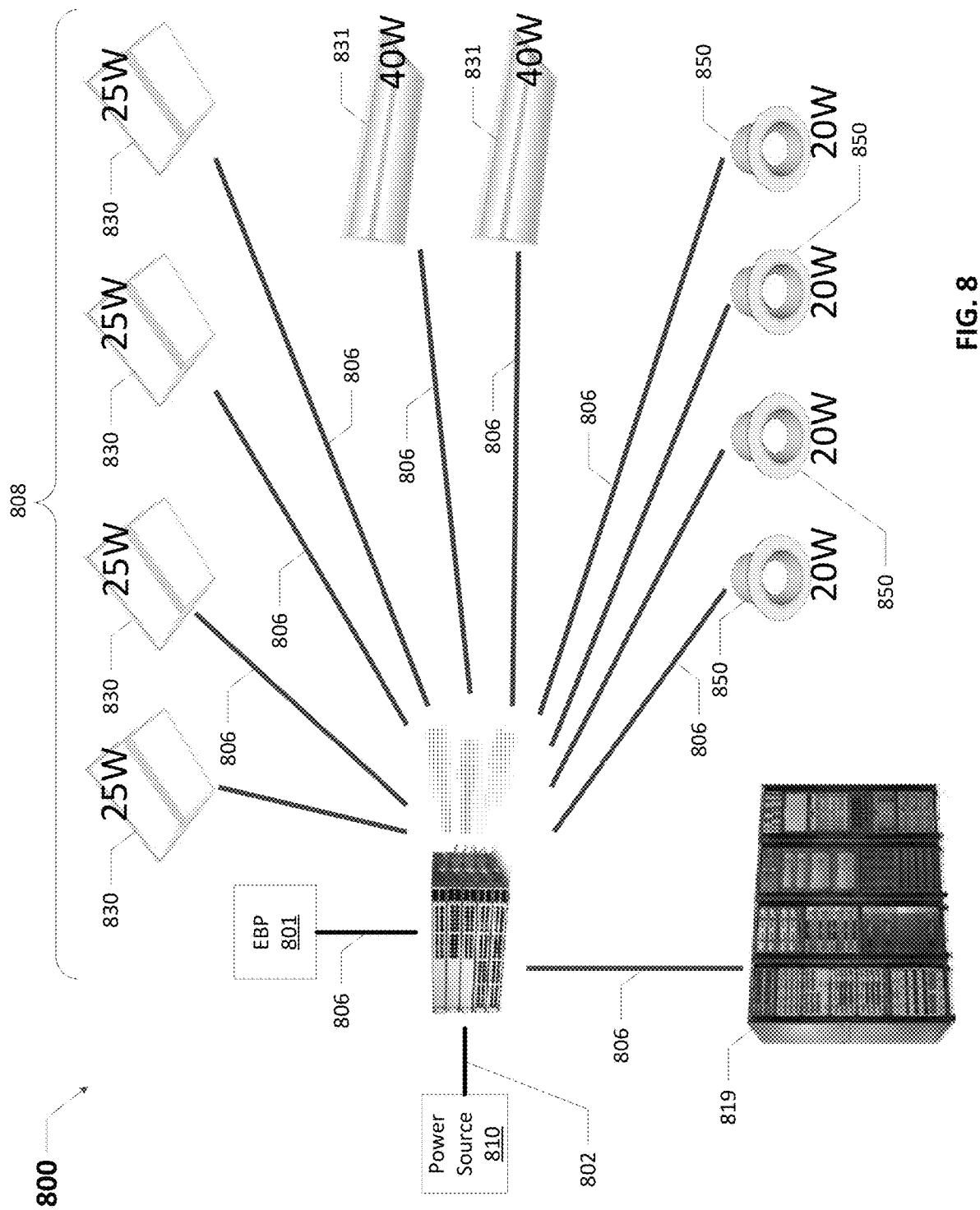
FIG. 8 shows a system diagram of another distributed low voltage power system for which example emergency battery packs can be used.

FIG. 8 shows a system diagram of yet another distributed low voltage power system in which example emergency battery packs can be used. Referring to FIGS. 1-8, the system 800 of FIG. 8 is substantially the same as the system 100 of FIG. 1 and the system 200 of FIG. 2, except that the PDM 820 of FIG. 8 has eight output channels. Four of the output channels of the PDM 820 provide LV signals, using communication links 806, to each of four troffer lights 830. Two other output channels of the PDM 820 provide LV signals, using communication links 806, to each of two different troffer light 231. The remaining four output channels of the PDM 820 provide LV signals, using communication links 806, to each of four can lights 850. The I/O channel in this case is coupled to a server 819 using communication links 806, where the server 809 can a type of controller.

The system 800 of FIG. 8 shows an example of a power-over-Ethernet (POE) configuration. In this architecture, each LV device 808 is "homerun" wired to the PDM 820, meaning that an output channel of the PDM 820 is dedicated to a single LV device 808. The PDM 820 in this case acts like an intelligent switch. This allows the system 800 to be configurable, allows for granular control, and have communication based on Internet protocols. One or more example emergency battery packs 801, as described above, can be used with the system 800 of FIG. 8 to provide low-voltage emergency power to one or more of the LV devices 808.

Example embodiments provide a number of benefits. Examples of such benefits include, but are not limited to, reduction in energy usage; more simplistic installation, replacement, modification, and maintenance of a system; qualification as a Class 2 device and/or system; compliance with one or more applicable standards and/or regulations; less need for licensed electricians; reduced downtime of equipment; lower maintenance costs, avoidance of catastrophic failure; increased flexibility in system design and implementation; improved reliability; improved maintenance planning; and reduced cost of labor and materials. Example embodiments can also be integrated (e.g., retrofitted) with existing systems.

Example embodiments are electrically safe. Example systems or any portion thereof can be free from risk (or a greatly reduced risk) of fire or electrical shock for any user installing, using, replacing, and/or maintaining any portion of example embodiments. For example, the LV signals that feed a device can allow a user to maintain the device without fear of fire or electrical shock. While Class 2 systems and SELV/PELV/FELV are described above, example embodiments can comply with one or more of a number of similar standards and/or regulations throughout the world. Example embodiments can also be installed and maintained without the use of conduit, cable trays, or similar components used to protect and isolate electrical cables.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A distributed low voltage power system, comprising:
a power distribution module (PDM) that distributes a low voltage signal through at least one output channel;
a point of load (PoL) driver that receives the low voltage signal from the at least one output channel of the PDM;
at least one electrical device coupled to the at least one output channel of the PoL driver, wherein the at least one electrical device operates using the low voltage signal; and
a self-contained emergency battery pack (EBP) coupled to the at least one output channel of the PDM and to the at least one electrical device, wherein the self-contained EBP is electrically disposed between the PoL driver and the at least one electrical device, wherein the self-contained EBP comprises a converter and at least one battery cell, wherein the self-contained EBP is physically separated from the PoL driver and the at least one electrical device,
wherein the self-contained EBP uses the low voltage signal, converted by the converter, to charge the at least one battery cell for a first period of time, wherein the self-contained EBP cuts off the low voltage signal from the at least one battery cell after the first period of time for a second period of time, wherein the self-contained EBP resumes allowing the low voltage signal to charge the at least one battery after the second period of time,
wherein the PDM distributes the low voltage signal during the first period of time and the second period of time, and
wherein the self-contained EBP releases emergency low voltage signal to the at least one electrical device when the PDM stops distributing the low voltage signal.

2. The distributed low voltage power system of claim 1, wherein the self-contained EBP comprises a controller that determines when the PoL driver has stopped distributing the low voltage signal, wherein the controller determines when the first period of time and the second period of time have been reached, and wherein the controller operates at least one switch within the self-contained EBP to control when the low voltage signal charges the at least one battery.

3. The distributed low voltage power system of claim 1, wherein the first period of time represents an end of an initial charge period following at least one of a group consisting of an initial installation of the self-contained EBP and an outage of the PDM in which the low voltage signal is not distributed by the PDM.

4. The distributed low voltage power system of claim 1, wherein the self-contained EBP qualifies as a Class 2 device.

5. The distributed low voltage power system of claim 1, wherein the at least one electrical device is used for lighting applications.

6. The distributed low voltage power system of claim 1, wherein the PDM comprises a power-over-Ethernet switch.

7. A distributed low voltage power system, comprising:
a point of load (PoL) driver that distributes a low voltage signal through at least one output channel;
at least one electrical device coupled to the at least one output channel of the PoL driver, wherein the at least one electrical device operates using the low voltage signal; and
an emergency battery pack (EBP) coupled to the at least one output channel of the Pot, driver and to the at least one electrical device, wherein the EBP is electrically disposed between the PoL, driver and the at least one electrical device, wherein the EBP comprises a switch, a controller, and at least one battery cell,
wherein the EBP uses the low voltage signal to charge the at least one battery cell, and wherein the EBP releases emergency low voltage signal to the at least one electrical device when the Pot, driver stops distributing the low voltage signal, and
wherein the switch of the EBP has an open position and a closed position, wherein the controller of the EBP operates the switch, wherein the switch is in the closed position when a condition is met, which allows an input signal from the EBP to flow to an input channel of the PoL driver, and wherein the switch is in the open position when the condition is not met, which prevents the input signal from the EBP to flow to the input channel of the PoL driver.

8. The distributed low voltage power system of claim 7, wherein the PoL driver receives power from a power distribution module.

9. The distributed low voltage power system of claim 7, wherein the PoL, driver is part of a PoL controller.

10. An emergency battery pack, comprising:
an input channel configured to receive low voltage (LV) signal from a point of load (PoL) driver;
a converter that converts the LV signal to a converted LV signal;
at least one battery unit coupled to the converter, wherein the at least one battery unit comprises at least one rechargeable battery that charges using the converted LV signal;
an output channel coupled to the at least one battery unit, wherein the output channel is further configured to couple to at least one electrical device; and
a first switch disposed between the input channel and the converter, wherein the first switch has an open position and a closed position,
wherein the first switch is in the closed position when a condition is met,
wherein the first switch is in the open position when the condition is not met,
wherein the at least one battery unit is configured to receive the LV signal when the first switch is in the closed position, wherein the at least one battery unit is configured to fail to receive the LV signal when the first switch is in the open position, and wherein the LV signal allows the emergency battery pack to qualify as a Class 2 device.

11. The emergency battery pack of claim 10, further comprising:
   a controller coupled to the first switch, wherein the controller operates the first switch between the closed position and the open position.

12. The emergency battery pack of claim 10, wherein the controller operates using the LV signal received at the input channel.

13. The emergency battery pack of claim 12, further comprising:
   a power supply coupled to and disposed between the input channel and the controller, wherein the power supply creates, using the LV signal, a controller signal used to operate the controller.

14. The emergency battery pack of claim 10, wherein the LV power source manipulates the LV signal received at the input channel for use by the at least one battery unit.

15. The emergency battery pack of claim 14, further comprising:
   a second switch disposed between the at least one battery unit and the output channel, wherein the second switch is operated by the controller and toggles between the at least one electrical device receiving the LV signal from the PoL driver and the at least one electrical device receiving the emergency LV signal from the at least one battery unit.

16. The emergency battery pack of claim 10, wherein the LV power source is a point of load driver.

17. The emergency battery pack of claim 10, wherein the LV power source is a power distribution module.

18. The emergency battery pack of claim 10, further comprising:
   a user interface that provides a status of the emergency battery pack to a user.

19. The emergency battery pack of claim 18, wherein the user interface indicates a status of the at least one battery unit.

20. The emergency battery pack of Claire 18, wherein the user interface allows a user to test the at least one battery unit.

* * * * *